US009788219B1

(12) United States Patent
Michel et al.

(10) Patent No.: US 9,788,219 B1
(45) Date of Patent: Oct. 10, 2017

(54) SYSTEM, METHOD, AND COMPUTER PROGRAM FOR REMOTELY DRIVING MOBILE WEB APPLICATION TESTING ON MOBILE DEVICES

(71) Applicant: Amdocs Development Limited, Limassol (CY)

(72) Inventors: Christophe Regis Jean-Jacques Michel, Chantepie (FR); Pierre-Erwann Gouesbet, Longaulnay (FR); Jean-François Pierre Marie Greffier, Rennes (FR)

(73) Assignee: Amdocs Development Limited, Limassol (CY)

( * ) Notice: Subject to any disclaimer, the term of this patent is extended or adjusted under 35 U.S.C. 154(b) by 0 days.

(21) Appl. No.: 15/239,732

(22) Filed: Aug. 17, 2016

Related U.S. Application Data

(60) Provisional application No. 62/209,811, filed on Aug. 25, 2015.

(51) Int. Cl.
    *H04B 17/00* (2015.01)
    *H04W 24/06* (2009.01)
    (Continued)

(52) U.S. Cl.
    CPC ............ *H04W 24/06* (2013.01); *H04L 63/04* (2013.01); *H04L 67/02* (2013.01); *H04W 24/10* (2013.01); *H04W 76/02* (2013.01)

(58) Field of Classification Search
    CPC ...... H04W 24/06; H04W 24/10; H04W 76/02
    (Continued)

(56) References Cited

U.S. PATENT DOCUMENTS 7,277,827 B2 * 10/2007 Shapiro ............... G06F 11/3672
                                                                  702/119
7,330,887 B1 * 2/2008 Dharmadhikari ... G06F 11/3419
                                                                  709/224
(Continued)

FOREIGN PATENT DOCUMENTS

CN         102708048 A    10/2012
CN         103902441 A     7/2014
(Continued)

*Primary Examiner* — April G Gonzales
(74) *Attorney, Agent, or Firm* — Zilka-Kotab, PC

(57) ABSTRACT

A system, method, and computer program product are provided for remotely driving mobile web application testing on mobile devices. In use, a secure connection is established between a test manager residing on a test management system and a mobile web application residing on a mobile device associated with a user, the secure connection being established to remotely drive one or more automated tests of the mobile web application residing on the mobile device by the test manager residing on the test management system. Additionally, a test scenario is sent from the test manager residing on the test management system to a test driver runtime component of the mobile web application residing on the mobile device, the test scenario including one or more steps for automatically testing the mobile web application residing on the mobile device. In response to the test driver runtime component executing the one or more steps for automatically testing the mobile web application residing on the mobile device, a report is received from the test driver runtime component of the mobile web application residing on the mobile device by the test manager residing on the test management system, the report including results of automatically testing the mobile web application residing on the mobile device.

20 Claims, 5 Drawing Sheets

(51) Int. Cl.
*H04W 76/02* (2009.01)
*H04L 29/08* (2006.01)
*H04W 24/10* (2009.01)
*H04L 29/06* (2006.01)

(58) Field of Classification Search
USPC .................................................... 455/67.11
See application file for complete search history.

(56) References Cited

U.S. PATENT DOCUMENTS

| | | | | |
|---|---|---|---|---|
| 8,160,572 | B2 * | 4/2012 | Bovet | H04W 24/06 455/423 |
| 8,620,305 | B2 * | 12/2013 | Singh | H04W 24/06 455/422.1 |
| 8,856,748 | B1 * | 10/2014 | Larsen | G06F 11/3668 717/125 |
| 8,930,917 | B2 * | 1/2015 | Mittal | G06F 11/366 717/124 |
| 9,459,994 | B2 * | 10/2016 | Koneru | G06F 11/3688 |
| 9,547,584 | B2 * | 1/2017 | Acharya | G06F 11/3688 |
| 9,621,845 | B2 * | 4/2017 | Shan | H04N 7/141 |
| 2012/0233505 | A1 | 9/2012 | Acharya et al. | |
| 2013/0007520 | A1 | 1/2013 | Giammarresi et al. | |
| 2013/0318498 | A1 | 11/2013 | Mittal et al. | |
| 2014/0004852 | A1 | 1/2014 | Lehmann et al. | |
| 2014/0237455 | A1 | 8/2014 | Koneru et al. | |

FOREIGN PATENT DOCUMENTS

| | | |
|---|---|---|
| KR | 101441131 B1 | 9/2014 |
| WO | 2014150306 A1 | 9/2014 |

\* cited by examiner

SYSTEM, METHOD, AND COMPUTER PROGRAM FOR REMOTELY DRIVING MOBILE WEB APPLICATION TESTING ON MOBILE DEVICES

CLAIM OF PRIORITY

This application claims the benefit of U.S. Provisional Application No. 62/209,811, filed Aug. 25, 2015, the entire contents of which are incorporated herein by reference.

FIELD OF THE INVENTION

The present invention relates to mobile web applications, and more particularly to remotely driving mobile web application testing on mobile devices.

BACKGROUND

HTML5 is considered as one of the best and most widely used languages for developing cross-platform mobile applications by packaging web content and executing the content on the existing native device Web Run Time (WRT).

Mobile web applications are indeed hybrid applications, intended to be installed on mobile devices, coupling both native coding and web coding executed on top of native APIs. Web contents define the application user interface (UI) and logic. Native implementation, based on mobile platform vendors' software development kits (SDKs), is used to render such web contents and to access the device native capabilities upon calls from a web layer.

The difference between a fully "native" application and a web application (also called a hybrid application, as it is both native and web based) is mainly associated with technology artifacts that are used to develop the application. A "native" mobile application is developed for a specific mobile platform only, using a specific vendor SDK, gathering native UI elements and having a look and feel specifically matching the running mobile operating system (OS).

A mobile web application is a native application for which the UI and logic is sitting on top of a native implementation (this means it relies on the native webview API and it can benefit from the exact same features), but developed according to HTML5 standards. The UI and logic of the application will use HTML/CSS/JS. This means that what has been developed can be reused across multiple mobile platforms and the developer does not have to learn a new ecosystem every time the developer wants to address a new mobile OS.

In the end, if the application is well designed, end-users will not be able to tell whether the application is a native application or a web application that is executed on their mobile devices.

There are many significant differences between a mobile web site rendered inside a mobile web browser and a standalone mobile web application. A mobile application is, unlike a mobile web site, distributed, standalone, executed in its own context, not using the same web runtime, accessing native APIs, benefiting from improved user experience (e.g. involving a native UI), and defined with its own security policy. As a consequence, there are many features that can sit within a mobile application that in no way can be found inside a mobile site, including interactions with the mobile operating system (e.g. accessing mobile device data and features). For the same reason, a mobile web application cannot work inside a mobile web browser, as it will not have access to the requested features, and such content will simply crash.

In the ecosystem of mobile web applications, it still remains difficult to test the behavior of a deployed mobile web application, such as in a production setting, reflecting the final ecosystem in which the applications will be used by target end-users. For example, it is difficult to test the behavior of a deployed mobile web application across a wide range of mobile devices, due to the wide range of mobile devices available on the market, high fragmentation of those devices with distinct characteristics, behavior and implementation, and the fact all those devices may not be available on site.

Additionally, it is difficult to ensure the same test procedures are used on the range of tested devices, to collect test reports, and aggregate related data. Furthermore, security restrictions present in most operating systems prevent the use of state of art tools to interact with the web runtime for this purpose.

There is thus a need for addressing these and/or other issues associated with the prior art.

SUMMARY

A system, method, and computer program product are provided for remotely driving mobile web application testing on mobile devices. In use, a secure connection is established between a test manager residing on a test management system and a mobile web application residing on a mobile device associated with a user, the secure connection being established to remotely drive one or more automated tests of the mobile web application residing on the mobile device by the test manager residing on the test management system. Additionally, a test scenario is sent from the test manager residing on the test management system to a test driver runtime component of the mobile web application residing on the mobile device, the test scenario including one or more steps for automatically testing the mobile web application residing on the mobile device. In response to the test driver runtime component executing the one or more steps for automatically testing the mobile web application residing on the mobile device, a report is received from the test driver runtime component of the mobile web application residing on the mobile device by the test manager residing on the test management system, the report including results of automatically testing the mobile web application residing on the mobile device.

DETAILED DESCRIPTION

Figure 1:
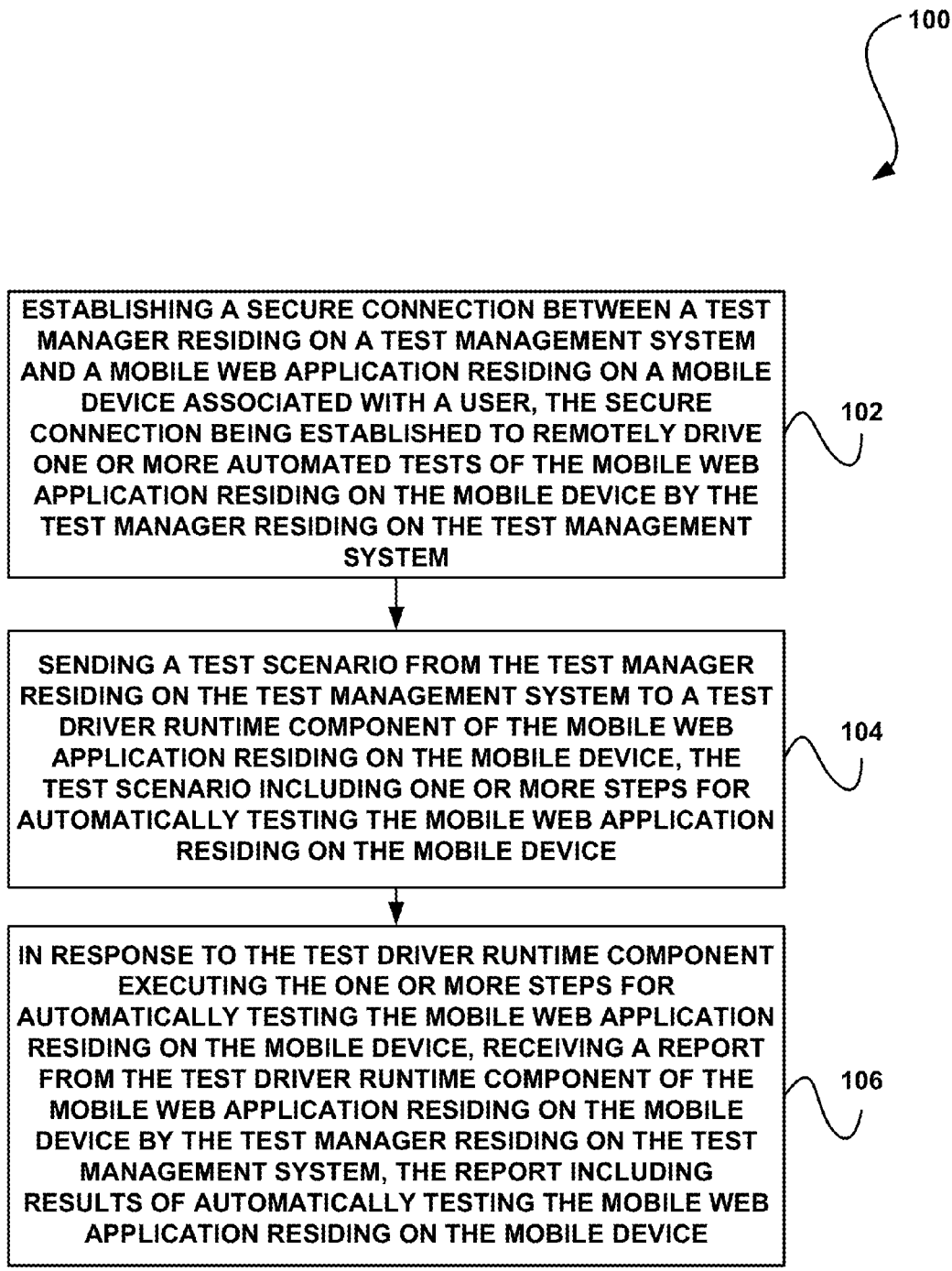
FIG. 1 illustrates a method for remotely driving mobile web application testing on mobile devices, in accordance with one embodiment.

FIG. 1 illustrates a method 100 for remotely driving mobile web application testing on mobile devices, in accordance with one embodiment.

As shown, a secure connection is established between a test manager residing on a test management system and a mobile web application residing on a mobile device associated with a user. See operation 102. The secure connection is established to remotely drive one or more automated tests of the mobile web application residing on the mobile device by the test manager residing on the test management system. The secure connection may be established over various types of networks. The test management system may establish the secure connection utilizing a variety of secure techniques.

The test manager may include any application, software, and/or computer code, etc. The mobile device may include any type of mobile device, such as a mobile phone, a tablet computer, etc. The test management system may include various hardware (e.g. processors, etc.) and software. The test management system is a separate system from the mobile device and may be in a separate location from the mobile device.

Additionally, a test scenario is sent from the test manager residing on the test management system to a test driver runtime component of the mobile web application residing on the mobile device. See operation 104. The test scenario includes one or more steps for automatically testing the mobile web application residing on the mobile device.

The mobile web application residing on the mobile device is automatically tested by the test driver runtime component, utilizing the test scenario, by executing the one or more steps to test the mobile web application. In one embodiment, executing the one or more steps for automatically testing the mobile web application residing on the mobile device by the test driver runtime component may include the test driver runtime component injecting each test action and waiting for at least one expected event before triggering a subsequent step. In this case, each test action may include simulating user interactions (e.g. simulating user actions on the mobile device, etc.).

In response to the test driver runtime component executing the one or more steps for automatically testing the mobile web application residing on the mobile device, a report is received from the test driver runtime component of the mobile web application residing on the mobile device by the test manager residing on the test management system. See operation 106. The report includes results of automatically testing the mobile web application residing on the mobile device.

The report may include an indication of successes or errors resulting from automatically testing the mobile web application residing on the mobile device. The test driver runtime component collects information resulting from executing the one or more steps for automatically testing the mobile web application residing on the mobile device to generate the report. Further, the test management system may return the mobile web application to a non-controlled mode in response to receiving the report.

Thus, a system, method, and computer program product are provided for remotely driving the execution of automated tests over mobile web applications installed on a mobile device. An agent controlling the web runtime (WRT) residing on a mobile device may communicate with a remote test management system residing on a computing device other than the mobile device.

This allows for a unique configuration point to make a unique application granted/packaged with remote control capability. This also allows for an end-to-end secured process to grant remote control to an application instance on a mobile device to a controlling server. Further, this results in the capability to control any application instance installed on any mobile device, with no restriction and no prerequisite.

It should be noted that the method 100 may be implemented utilizing various systems, hardware (e.g. processors, etc.), software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
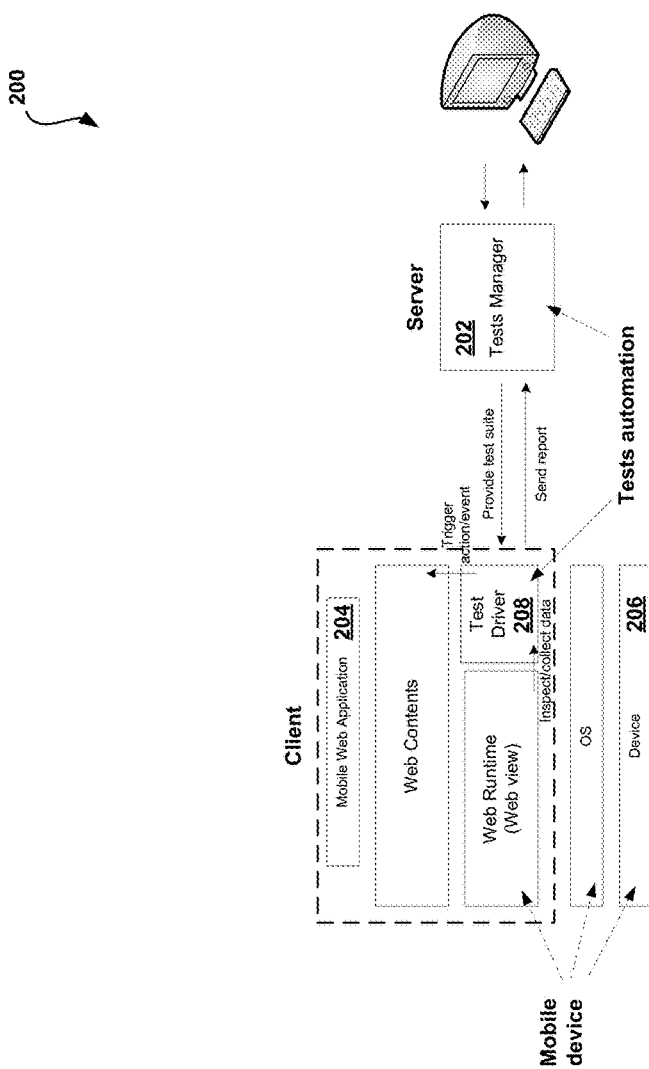
FIG. 2 illustrates a system for remotely driving mobile web application testing on mobile devices, in accordance with one embodiment.

FIG. 2 illustrates a system 200 for remotely driving mobile web application testing on mobile devices, in accordance with one embodiment. As an option, the system 200 may be implemented in the context of the details of FIG. 1. Of course, however, the system 200 may be implemented in the context of any desired environment. Further, the aforementioned definitions may equally apply to the description below.

FIG. 2 shows a system to drive and execute test scenarios for a mobile web application on multiple mobile devices, and then to consolidate obtained results. The inner purpose of the system 200 is to enable control of such mobile web application on a mobile device the tester does not have in-hand.

After the owner/user of the mobile device has agreed/activated remote control from a server, the server will be able control/interact with the application, without requiring additional human interaction. At this point, from the controlling server, it will be possible to collect any relevant piece of information that is helpful for diagnostic purposes of the application on the device. Sensitive data will be protected from such collection.

As shown in FIG. 2, the system 200 includes a test manager 202, which is a central server runtime component that allows management of test campaigns and the control of a mobile web application 204 on a device 206, through a test driver client runtime component 208, and to inject directives to execute selected test scenarios. At the end of the test execution, or in case the test execution failed, a report is provided to the tester.

The test driver 208, which may be a client runtime component (agent) integrated into the mobile web application 204 at packaging time, can be used as an entry point for the test manager 202 server component to drive the execution of requested test scenarios by injecting directives inside the application. In the case the test driver 208 is not called, the mobile web application 204 executes in nominal conditions, expecting human user interactions. When the test manager 202 activates the test driver 208, the test driver 208 takes control, injecting directives to drive the device 206, executing expected test scenarios. The directives are the same when addressing any mobile operating system and version.

The mobile web application control for test execution is driven through a secured channel based on state of the art security implementation, thus preventing other harmful components to be able to use this feature as a security leak.

Figure 3:
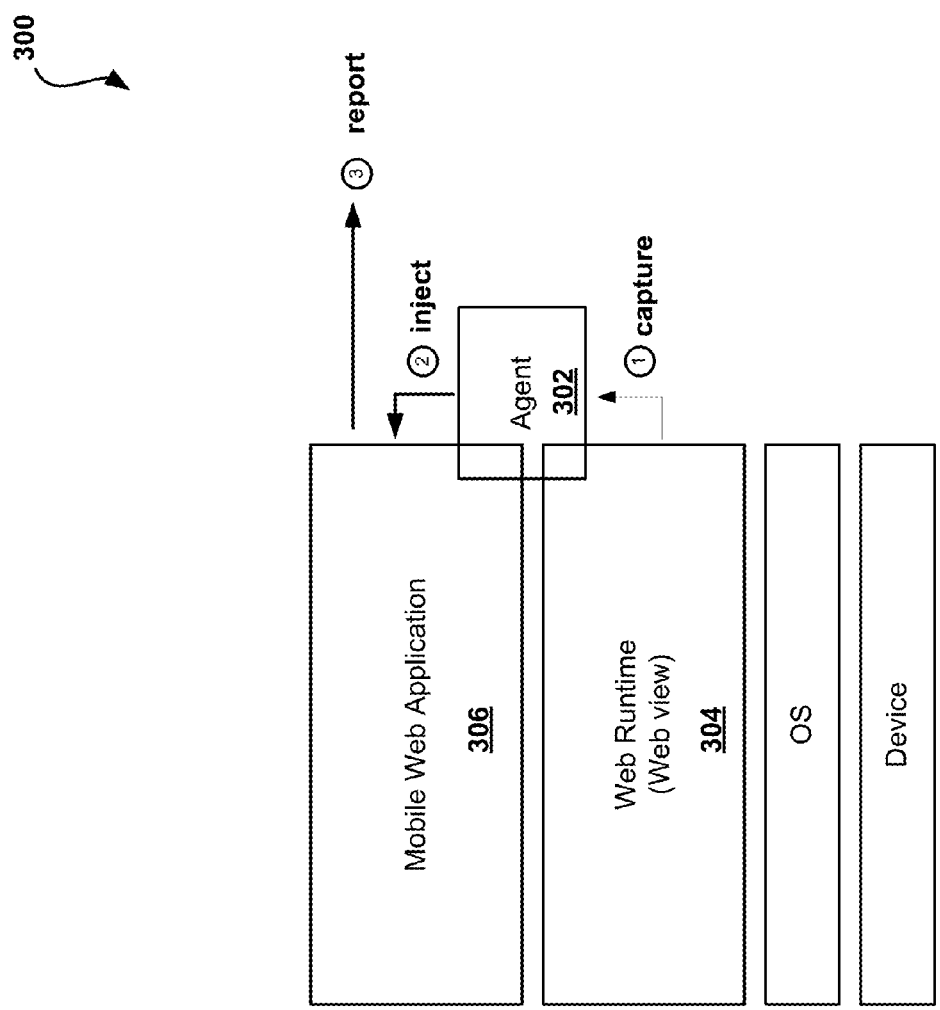
FIG. 3 illustrates a system diagram showing test driver operation for remotely driving mobile web application testing on mobile devices, in accordance with one embodiment.

FIG. 3 illustrates a system diagram 300 showing test driver operation for remotely driving mobile web application testing on mobile devices, in accordance with one embodiment. As an option, the diagram 300 may be implemented in the context of the details of the previous figures. Of course, however, the diagram 300 may be implemented in the context of any desired environment. Further, the aforementioned definitions may equally apply to the description below.

The packaging of a mobile web application 306 equipped with remote testing features is made of web contents (defining the user interface and logic of the application) and an agent 302. The agent 302 is silent when the mobile application is used in a standard way but can be activated remotely when the test manager decides to take control in order to execute a test scenario. When activated, the agent 302 will intercept all events from the web runtime component 304, and inject interactions in the application (instead of real end-user in standard usage mode). The agent 302 also collects all relevant information on the test scenario execution in order to report it to the test manager.

Packaging the agent 302 in the mobile application can be done thanks to simple and unique configuration points, bringing in the agent 302 for all targeted mobile platforms.

As a consequence, due to this packaging mode, the tested application can be the real application, as distributed to end-users (as it is equipped with the agent enabling to activate a test mode). Additionally, no third-party application is required to be installed on the mobile device to manage test execution, as the agent 302 is packaged within the application itself. Further, there is no impact on the application performance in standard mode (as the agent 302 is inactive).

In order to be able to proceed to the execution of a defined test scenario for a mobile web application on a defined set of mobile devices, some actions will need to be performed as prerequisites. The test manager needs to be installed on a hosting server, be able to be accessed by a tester from a workstation (web browser), and a test scenario needs to be loaded by the tester (or other contributor). Additionally, mobile web applications may need to have a remotely driven test execution option activated in an application build configuration, an access point (URL) to a trusted test manager set in the application build configuration, a security key (certificate) to protect access from the test manager set in the application build configuration, an application build with this configuration, and the application installed on target devices.

Test cases may be defined for all supported mobile platforms and versions. The test cases do not need to be rewritten or adjusted to address specific mobile platforms or versions.

A test would be modeled in standard way: precondition+procedure+post-condition. A precondition is the context that will be awaited before triggering the procedure. If not verified, the test will not be started. A procedure is a sequence of interactions that will be simulated by the server by injecting a script (with no real end-user interaction required).

A post-condition is the context that must be verified once the procedure has been fully executed. If not verified, the test will fail. The context for preconditions and post-conditions includes checking application data and/or user interfaces.

The techniques and systems described herein do not require any specific test definition implementation and provide compatibility with existing web standard test definition implementations.

In operation, the flow to execute a test includes: the test manager shaking hands with the application to activate a secured channel; the test manager sending a test scenario to the application test driver; and the test driver injecting successfully each test action (simulating user interactions) and waiting for expected events before triggering the next step. At the end of the process, the test driver sends a report indicating success/errors back to test manager and restores the application to a non-controlled mode. Additionally, the test manager shows the report per tested device.

There are many advantages to the systems and techniques described herein. For example, any application packaged with this solution will be ready for executing automated test campaigns. Additionally, enabling the solution's ability has no impact on application performance and can be removed for the final application packaging (for production/distribution). Further, no specific action for each supported mobile platform or version is required from the person packaging the application (i.e. the packaging person will have to operate one single action for all target mobile platforms).

As another example, there is no need to deploy any additional component or software on the mobile devices. This is a significant advantage in the sense that the provider of the application cannot enforce any end-user to install another application so the provider can then either test the application or support the end-user to address an issue.

Moreover, if ever it was easy to convince the end-user to install such additional application, the provider would have to deal with all technical means to have this additional provisioning for any mobile device (outside application stores). With unique applications to package and distribute, as soon as the end-user has installed the (unique) application on a device, everything is ready for activating such capability.

Still yet, as there is no third-party application to be installed together with the tested application on mobile devices, the tester does not need to have all tested devices in hand. The tested fleet can include both local and remote mobile devices that will be driven from the central management console.

Most available solutions for test automation in the web area are applicable to desktop web browsers only. In other words, the execution of web content always sits in the same application (web browser).

In the case of mobile web applications, the related web content can only be executed inside each application. It is not applicable to execute tests on the same web contents on desktops web browsers, as mobile devices have specificities, including in terms of HTM5/CSS/JS support. Additionally, it is not applicable to execute tests on the same web contents in the mobile web browsers, as mobile applications rely on a specific web runtime native API (which cannot be strictly compared to a native web browser, including in terms of HTM5/CSS/JS support), and have specific access to device features and data (which cannot be triggered/accessed from a mobile web browser).

Most current solutions only offer what can be seen as just one enabler to cover a subset of the overall system described herein to actually enable remotely driven testing.

The techniques and systems described herein are not only about testing applications on devices, but testing applications on devices that are out of sight. The techniques and systems described herein offer: a single configuration point to enable remotely driven test scenario execution on all mobile platforms and versions; installation of unique test ready applications, no other third party component or application to be installed on tested mobile devices, where the application itself is self-sufficient; simultaneous test of multiple application instances/multiple devices at once; and secured channel for test scenario execution, with application registration to trusted test manager, through a secured connection.

Figure 4:
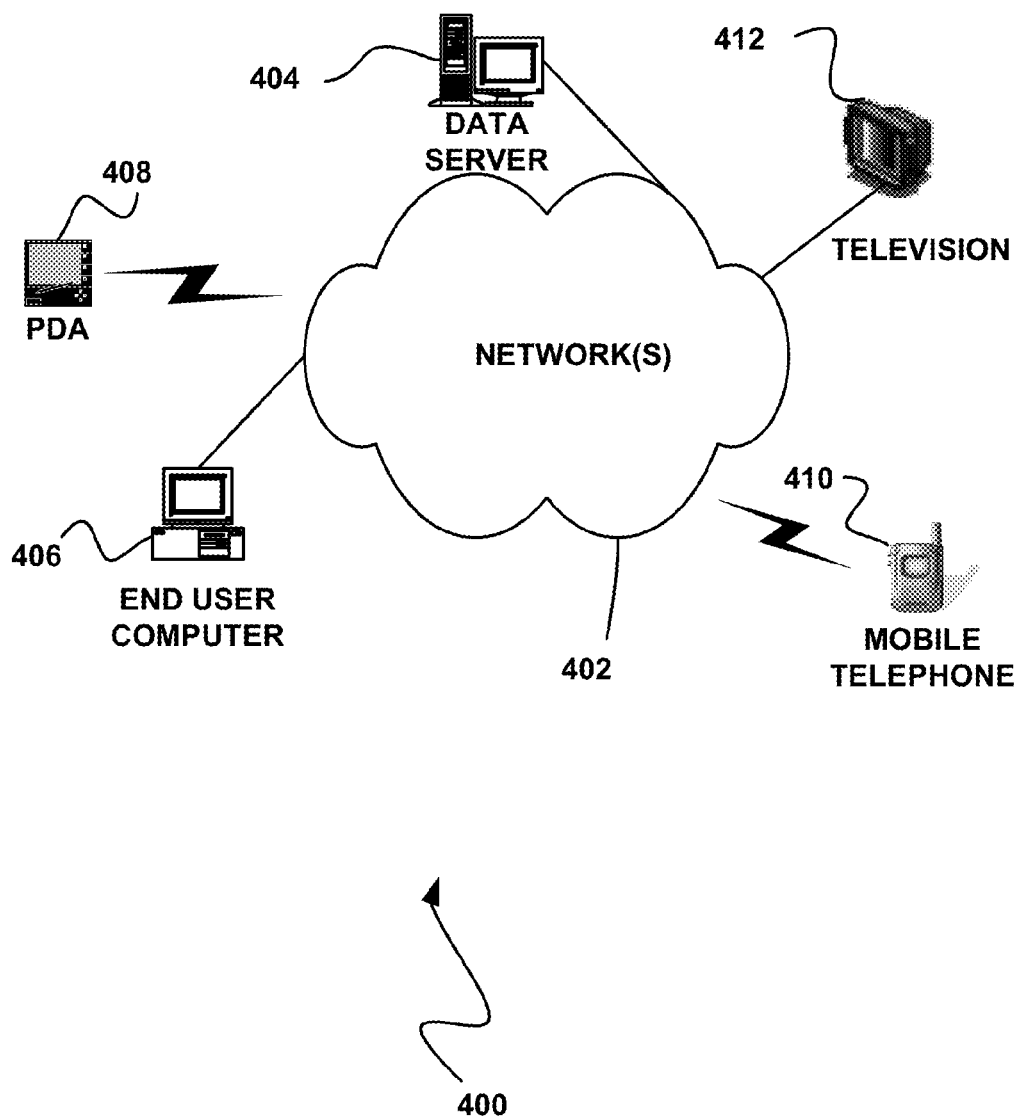
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
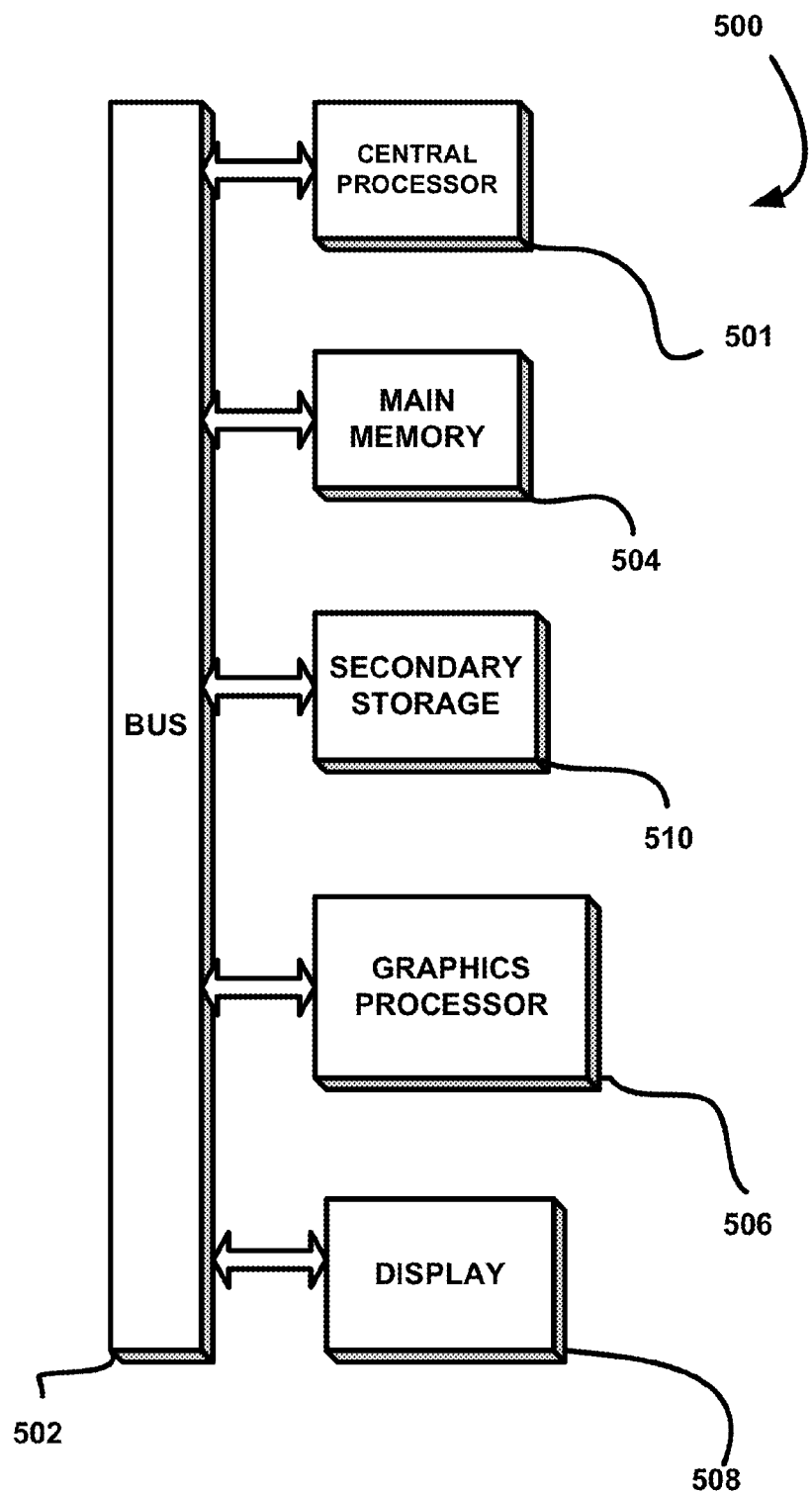
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   establishing, by a test management system, a secure connection between a test manager residing on the test management system and a mobile web application residing on a mobile device associated with a user, the secure connection being established to remotely drive one or more automated tests of the mobile web application residing on the mobile device by the test manager residing on the test management system;
   sending a test scenario from the test manager residing on the test management system to a test driver runtime component of the mobile web application residing on the mobile device, the test scenario including one or more steps for automatically testing the mobile web application residing on the mobile device; and
   in response to the test driver runtime component executing the one or more steps for automatically testing the mobile web application residing on the mobile device, receiving a report from the test driver runtime component of the mobile web application residing on the mobile device by the test manager residing on the test management system, the report including results of automatically testing the mobile web application residing on the mobile device.

2. The method of claim 1, further comprising automatically testing the mobile web application residing on the mobile device, by the test driver runtime component, utilizing the test scenario, by executing the one or more steps to test the mobile web application.

3. The method of claim 1, wherein executing the one or more steps for automatically testing the mobile web application residing on the mobile device by the test driver runtime component includes the test driver runtime component injecting each test action and waiting for at least one expected event before triggering a subsequent step.

4. The method of claim 3, wherein each test action includes simulating user interactions.

5. The method of claim 1, wherein the report includes an indication of errors resulting from automatically testing the mobile web application residing on the mobile device.

6. The method of claim 1, wherein the test driver runtime component collects information resulting from executing the one or more steps for automatically testing the mobile web application residing on the mobile device to generate the report.

7. The method of claim 1, wherein test management system returns the mobile web application to a non-controlled mode in response to receiving the report.

8. A computer program product embodied on a non-transitory computer readable medium, comprising computer code for:
   establishing, by a test management system, a secure connection between a test manager residing on the test management system and a mobile web application residing on a mobile device associated with a user, the secure connection being established to remotely drive one or more automated tests of the mobile web application residing on the mobile device by the test manager residing on the test management system;
   sending a test scenario from the test manager residing on the test management system to a test driver runtime component of the mobile web application residing on the mobile device, the test scenario including one or more steps for automatically testing the mobile web application residing on the mobile device; and
   in response to the test driver runtime component executing the one or more steps for automatically testing the mobile web application residing on the mobile device, receiving a report from the test driver runtime component of the mobile web application residing on the mobile device by the test manager residing on the test management system, the report including results of automatically testing the mobile web application residing on the mobile device.

9. The computer program product of claim 8, further comprising computer code for automatically testing the mobile web application residing on the mobile device, by the test driver runtime component, utilizing the test scenario, by executing the one or more steps to test the mobile web application.

10. The computer program product of claim 8, wherein executing the one or more steps for automatically testing the mobile web application residing on the mobile device by the test driver runtime component includes the test driver runtime component injecting each test action and waiting for at least one expected event before triggering a subsequent step.

11. The computer program product of claim 10, wherein each test action includes simulating user interactions.

12. The computer program product of claim 8, wherein the report includes an indication of errors resulting from automatically testing the mobile web application residing on the mobile device.

13. The computer program product of claim 8, wherein the test driver runtime component collects information resulting from executing the one or more steps for automatically testing the mobile web application residing on the mobile device to generate the report.

14. The computer program product of claim 8, wherein test management system returns the mobile web application to a non-controlled mode in response to receiving the report.

15. A system, comprising:
one or more hardware processors configured for:
establishing, by a test management system, a secure connection between a test manager residing on the test management system and a mobile web application residing on a mobile device associated with a user, the secure connection being established to remotely drive one or more automated tests of the mobile web application residing on the mobile device by the test manager residing on the test management system;
sending a test scenario from the test manager residing on the test management system to a test driver runtime component of the mobile web application residing on the mobile device, the test scenario including one or more steps for automatically testing the mobile web application residing on the mobile device; and
in response to the test driver runtime component executing the one or more steps for automatically testing the mobile web application residing on the mobile device, receiving a report from the test driver runtime component of the mobile web application residing on the mobile device by the test manager residing on the test management system, the report including results of automatically testing the mobile web application residing on the mobile device.

16. The system of claim 15, wherein the one or more hardware processors are further configured for automatically testing the mobile web application residing on the mobile device, by the test driver runtime component, utilizing the test scenario, by executing the one or more steps to test the mobile web application.

17. The system of claim 15, wherein executing the one or more steps for automatically testing the mobile web application residing on the mobile device by the test driver runtime component includes the test driver runtime component injecting each test action and waiting for at least one expected event before triggering a subsequent step.

18. The system of claim 17, wherein each test action includes simulating user interactions.

19. The system of claim 15, wherein the report includes an indication of errors resulting from automatically testing the mobile web application residing on the mobile device.

20. The system of claim 15, wherein the test driver runtime component collects information resulting from executing the one or more steps for automatically testing the mobile web application residing on the mobile device to generate the report.

\* \* \* \* \*